United States Patent [19]
Baek

[11] Patent Number: 5,444,585
[45] Date of Patent: Aug. 22, 1995

[54] VCR TAPE LOADING MECHANISM WITH REDUCE MOTOR CURRENT DRAWING DURING LOADING BY STAGGERING TIME TYPE LOADING ARMS CONTACT THE BASE STOPS

[75] Inventor: Myung C. Baek, Seoul, Rep. of Korea

[73] Assignee: Goldstar Co., Ltd., Seoul, Rep. of Korea

[21] Appl. No.: 306,851

[22] Filed: Sep. 15, 1994

Related U.S. Application Data

[63] Continuation of Ser. No. 977,952, Nov. 18, 1992, abandoned.

[30] Foreign Application Priority Data

Nov. 19, 1991 [KR] Rep. of Korea .................. 1991-19789

[51] Int. Cl.6 ............................................. G11B 5/027
[52] U.S. Cl. ......................................... 360/85; 360/25
[58] Field of Search ................................... 360/85, 95

[56] References Cited

U.S. PATENT DOCUMENTS 4,727,441  2/1988  Tsuchida ............................... 360/85
5,227,933  7/1993  Konishi ................................. 360/85

Primary Examiner—A. J. Heinz
Attorney, Agent, or Firm—Morgan & Finnegan

[57] ABSTRACT

A tape loading apparatus of a video cassette recorder includes members for drawing out tape from a video cassette, and first and second bases for mounting the members. In addition, a device which moves the first and second bases to a loading position where the first base engages a first stopper and the second base engages a second stopper is also provided. Accordingly, the first base engages the first stopper before the second base engages the second stopper resulting in a difference in time between when the first and second bases engage the first and second stoppers. The tape loading apparatus also includes a power source for driving the device. Finally, the electric current load generated by the power source is thereby reduced because the load exerted for moving the first and second bases occurs within the difference in time.

12 Claims, 5 Drawing Sheets

VCR TAPE LOADING MECHANISM WITH REDUCE MOTOR CURRENT DRAWING DURING LOADING BY STAGGERING TIME TYPE LOADING ARMS CONTACT THE BASE STOPS

This is a continuation of application Ser. No. 07/977,952, filed on Nov. 18, 1992, now abandoned.

FIELD OF THE INVENTION

The present invention relates to a Video Cassette Recorder (hereinafter called VCR) tape loading mechanism, and more particularly to a VCR tape loading mechanism adapted to lower maximum loading electric current when slant bases are compressed against stoppers.

BACKGROUND OF THE INVENTION

Referring to FIG. 1, there is shown a top view of a conventional tape running system (schematic) in a VCR. The VCR tape loading mechanism is a mechanism to draw out a tape 11 accommodated in a VCR cassette 10 and leads to a drum 1 having rotating heads thereon to slip halfway round the drum 1 at a predetermined position and angle of entry and leaving.

Shown in FIGS. 2 and 3 are the construction of above mentioned conventional VCR tape loading mechanism.

The slant posts 4a and 4a that draw out a VCR tape respectively are positioned in the upper surfaces of slant bases 4 and 4 respectively adapted to move along the guide grooves 3 and 3 respectively.

One end of the second loading levers are connected to the slant bases 4 and 4 respectively and the other ends are pinned to one end of first loading levers 6 and 6 respectively to move around them.

The other ends of the first loading levers 6 and 6 are fixed at shafts 5a and 5a of loading gears 5 and 5 respectively.

A sector gear 8 has gear teeth 8a in one end and a pin 8b in the other end and the gear teeth 8a are meshed with the gear teeth of one of the loading gears 5 and 5.

The power of a loading motor 14 is transmitted to a worm 10 through a motor pulley 13, a belt 12, and a worm pulley 11, The worm 10 rotates a cam gear 9 having a cam groove 9a on the surface.

The pin 8b of sector gear 8 is inserted in the cam groove 9a of the cam gear 9.

Torsion springs 18 and 18, being engaged, positioned coaxially between the loading gears 5 and 5 and the first loading levers 6 and 6 respectively, pushing the first loading levers 6 and 6 against stoppers 5b and 5b respectively provided on the loading gears 5 and 5 respectively (Refer to FIG. 7)

Referring to FIG. 1, the loading operation of a VCR tape running system, equipped with above mentioned VCR tape loading mechanism, is as follows;

A VCR tape 11 wound on reels 10a and 10a accommodated in a cassette 10 is, drawn out by the slant posts respectively, slipped half way round a drum 1 having rotating heads thereon at a predetermined angle of entry and leaving, and transmit electric signals to the rotating heads during reproduction. Meanwhile as known well, the tape is transferred by a capstan shaft 15 and a pinch roller 16.

Referring to FIG. 2 and FIG. 3, the operation of above mentioned VCR tape loading mechanism will be described.

Shown in FIG. 2 is unloaded condition, where the first loading levers 6 and 6 are in contact with the stoppers 5b and 5b of the loading gears 5 and 5 respectively.

Referring to FIG. 3, the description will be focused on the loading operation first.

During loading operation, the loading motor 14, upon rotation in clockwise direction seen from the pulley 13 side, rotates the cam gear 9 in counter clockwise direction through the motor pulley 13, the belt 12, the worm pulley 11 and the worm 10, and the pin 8b of the sector gear 8 is inserted in cam groove 9a rotates in clockwise direction following the displacement of the cam groove 9a.

When one of the loading gears 5 and 5 meshed with the teeth of the sector gear 8 rotates in counter clockwise direction, the other loading gear 5 rotates in clockwise direction, and the first loading levers 6 and 6 rotate accordingly.

The slant bases 4 and 4 move along the guide grooves 3 and 3 respectively in response to the movements of the first loading levers 6 and 6 respectively and the second loading levers 7 and 7 respectively.

When the slant bases 4 and 4 come to a loading completion position respectively, where the stoppers 2 and 2 respectively hold any further movement of slant bases 4 and 4 respectively, the respective positions of the first loading levers 6 and 6 and the second loading levers 7 and 7 are fixed accordingly. Thereafter when the loading gears 5 and 5 respectively keep on rotating further than above loading completion position, the stoppers 5b and 5b of the loading gears 5 and 5 respectively leave the first loading levers 6 and 6 respectively making the respective spring forces of the engaged torsion springs push the first loading levers 6 and 6 respectively to push the slant bases 4 and 4 respectively against respective stoppers 2 and 2.

The unloading operation is carried out by the reversal of the loading motor 14 making above described loading movement in opposite direction.

In the meantime, referring to FIGS. 8(a) and (b), there are shown load-time curves of the supply loading gear and take-up loading gear respectively, of a conventional VCR tape loading mechanism wherein the maximum electric current of the loading motor is increased suddenly (Refer to FIG. 8(c)) because the starting of pushing by respective slant bases 4 and 4 against respective stoppers 2 and 2 are the same thereby the loads from respective loading gears 5 and 5 exerted on the loading motor 14 are the same too.

Consequently the loading motor 14 requires larger capacity, which causes cost increase to make the product having the larger capacity motor smaller, especially in the case of a camcorder it causes functional problem due to the unavoidable limit of driving power source.

SUMMARY OF THE INVENTION

The present invention has been made in view of the above described problems occuring in the prior art VCR tape loading mechanism and an object of the invention is to provide a VCR tape loading mechanism which is able to lower maximum load electric current exerted on a loading motor during a VCR tape loading.

In accordance with the present invention, the object mentioned above can be accomplished by providing, bases adapted with tape drawing out members respectively loaded and unloaded by first 51 and second loading gears respectively, and the loading is completed with time lag.

Accordingly, the maximum loads exerted on the first loading gear and second loading gear with the time lag, thereby making the maximum loads of first loading gear and second loading gear transmit to the loading motor, which is the driving source of the first loading gear and second loading gear, not on the same time but with time lag.

BRIEF DESCRIPTION OF THE DRAWINGS.

These and the other objects, features and advantages of the invention will become more apparent upon a reading of the following detailed specification and drawings, in which.

DETAILED DESCRIPTION OF THE INVENTION

A VCR tape loading mechanism according to the present invention will now be described referring to the accompanying drawings as an example.

Figure 1:
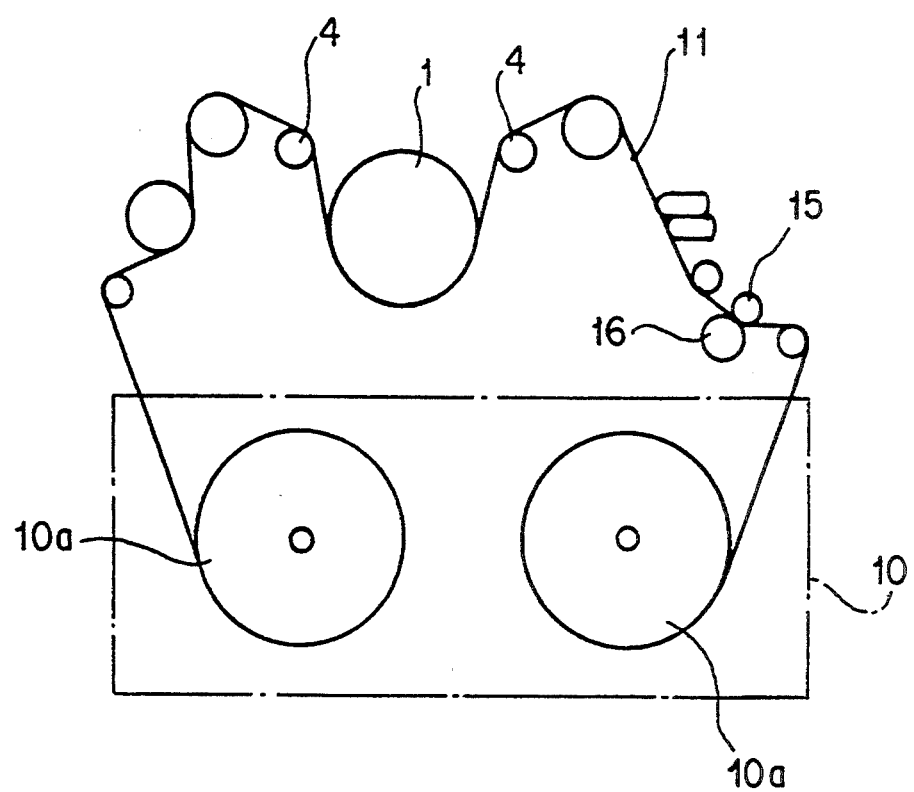
FIG. 1 shows a top view of a conventional VCR tape running system(schematic).
Figure 2:
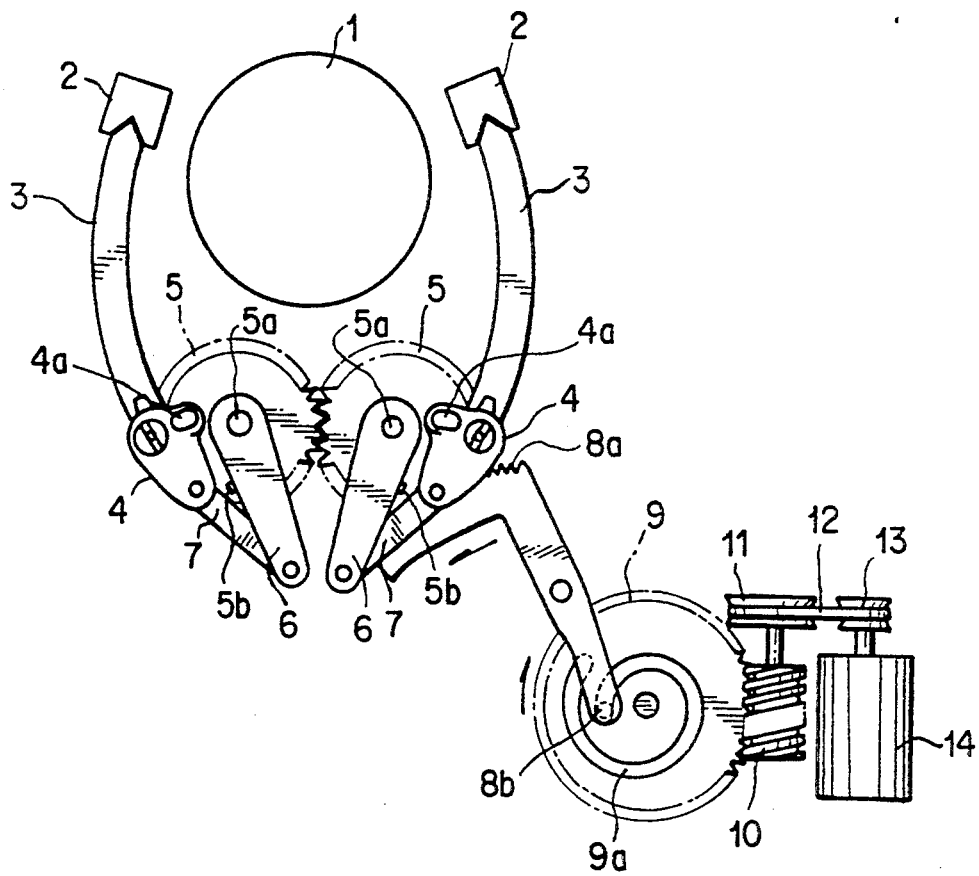
FIG. 2 and FIG. 3 are a conventional VCR tape loading mechanism, shown in the unloaded condition and loaded condition respectively.
Figure 3:
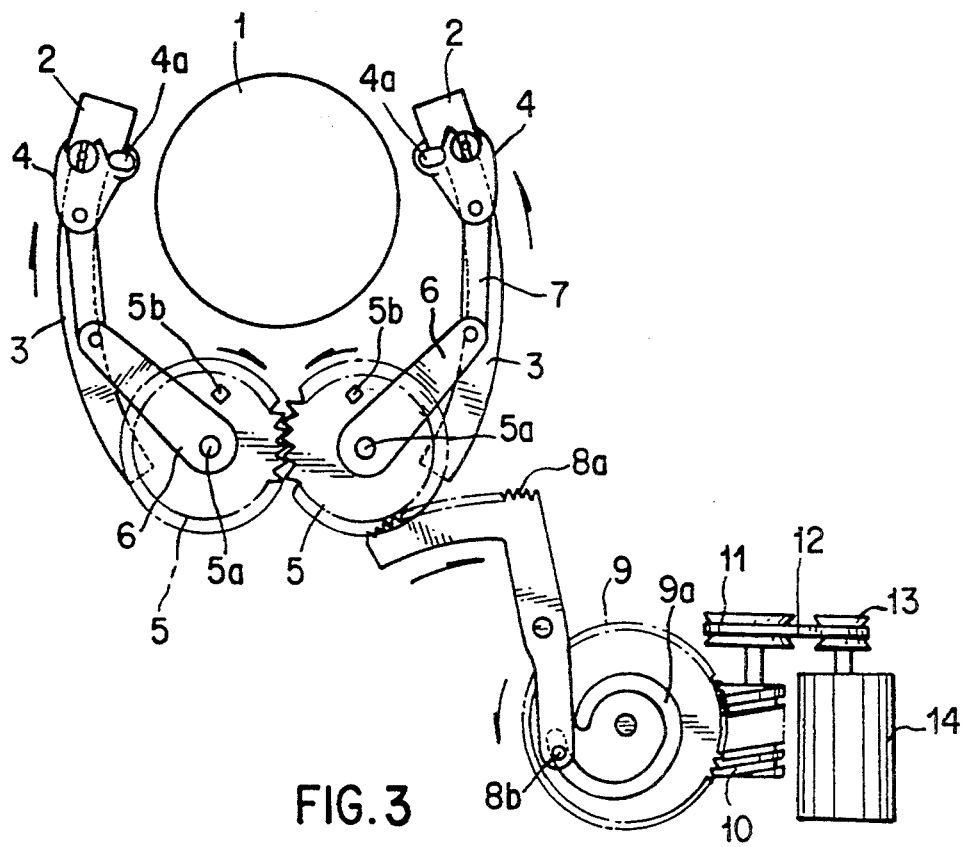
Figure 4:
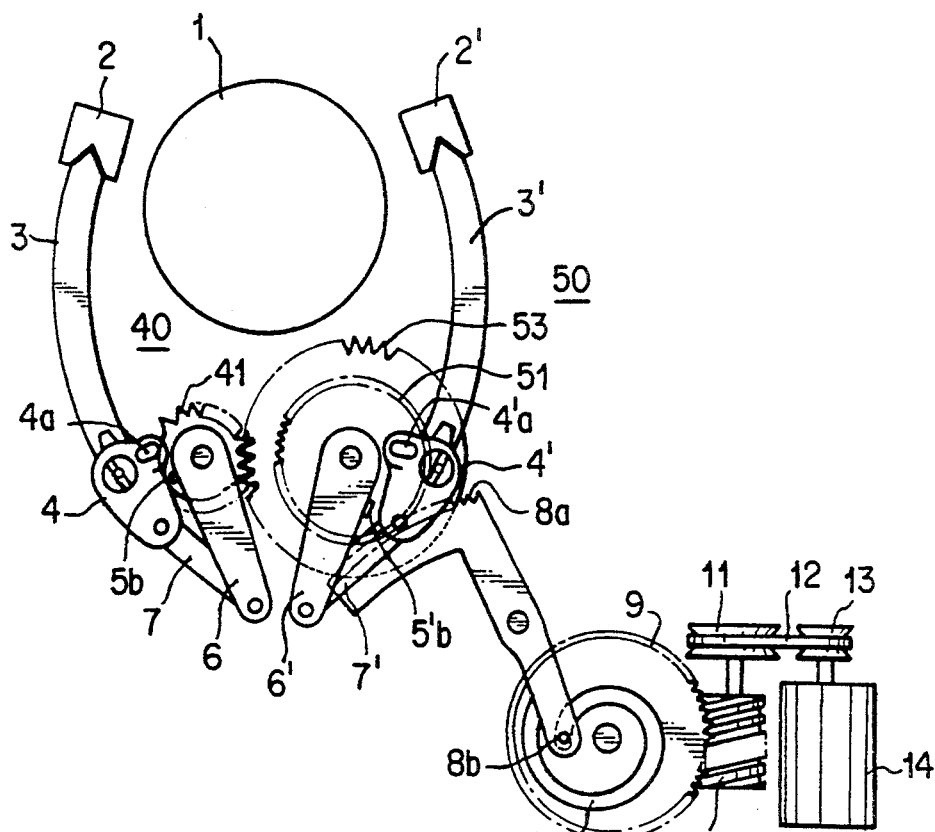
FIG. 4, FIG. 5 and FIG. 6 are a VCR tape loading mechanism according to the present invention, shown in the unloaded condition, under unloading/loading condition and loaded condition respectively.
Figure 5:
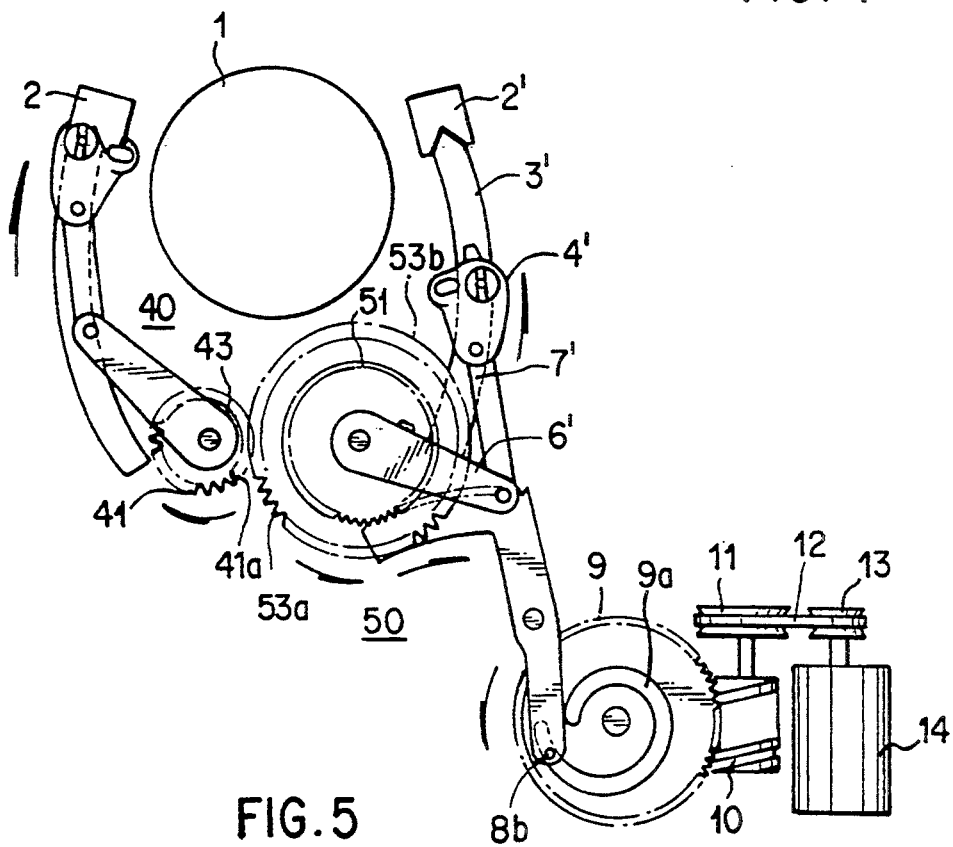
Figure 6:
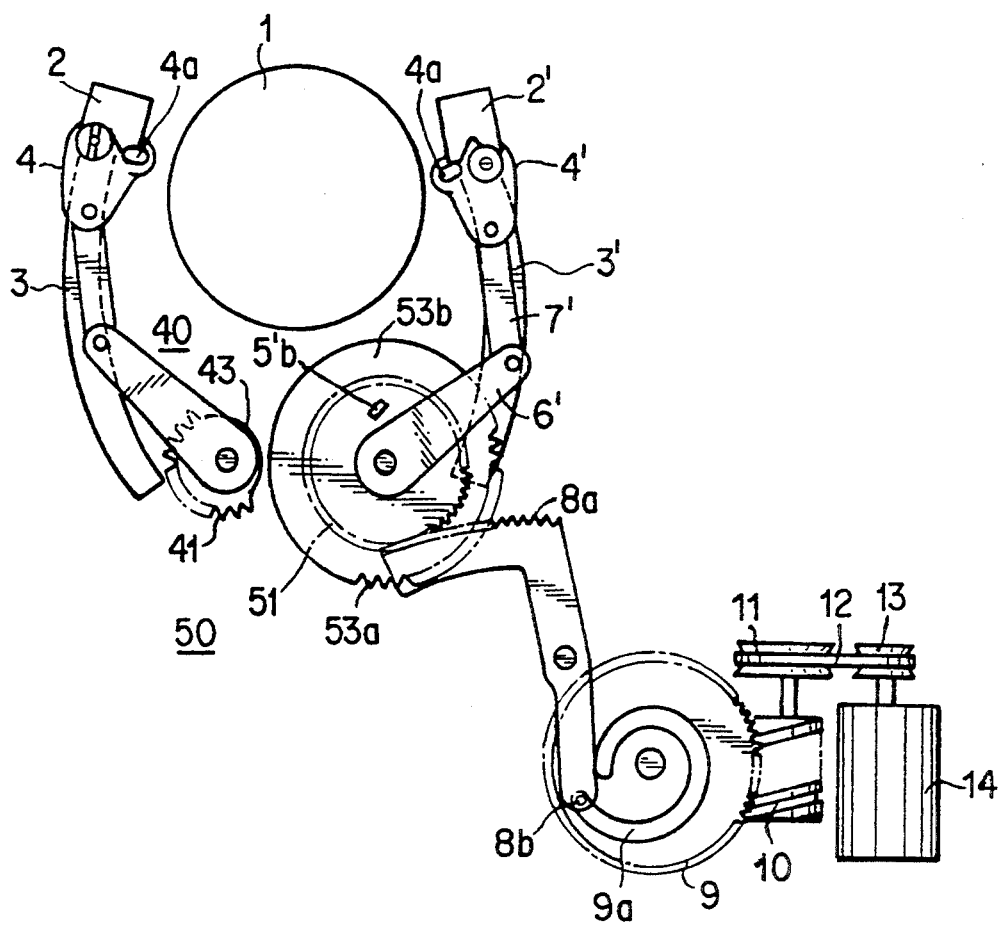
Figure 7:
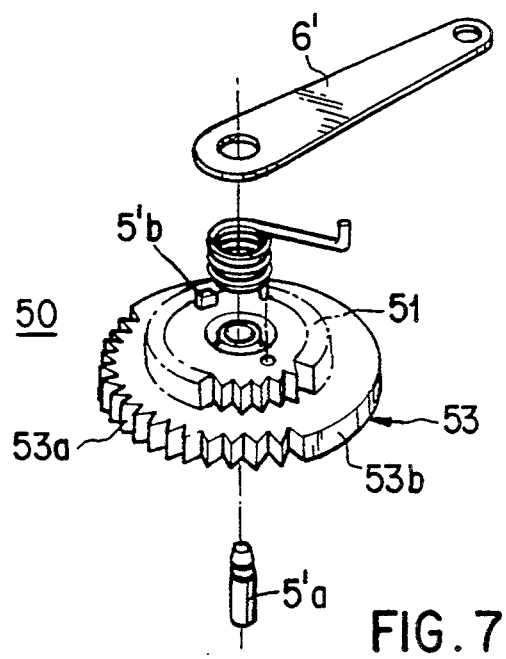
FIG. 7 shows a exploded perspective view of a loading gear in accordance with the present invention.
Figure 8A:
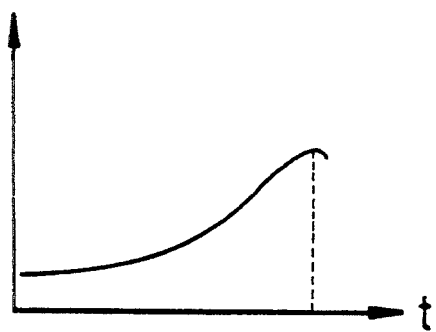
FIGS. 8(a),(b) and (c) show load-time curves of loading gears and an electric current-time curve of a loading motor of a conventional VCR tape loading mechanism as follows;
(a) A load-time curve of a supply loading gear.
(b) A load-time curve of a take-up loading gear.
(c) An electric current-time curve of a loading motor.

Referring to FIGS. 4 to 6, there are shown a cam gear 9 (driven by a series of conventional power transmission from a) loading motor 14 to a worm 10 through a motor pulley 13, a belt 12 and a worm pulley 11. A sector gear 8 moves in response to the displacement of a cam groove 9a formed in one side of a cam gear 9. A take-up loading gear 50 moving in response to the movement of the sector gear 8 comprises first gear part 51 meshed with the teeth 8a of the sector gear 8 and second gear part 53 formed coaxially with the first gear part.

The second gear part 53 comprises a geared section 53a with gear teeth and a non geared section 53b without gear teeth.

A supply loading gear 40, also comprises a geared section 41 and a non geared section 43, and meshes with the geared section 53a of the second gear 53 of the take-up loading gear 50 selectively.

The P.C.D. (Pitch Circle Diameter) of the geared section 41 of the supply loading gear 40 is formed smaller than that of the second gear part 53 of the take-up loading gear 50 in order for the supply loading gear 40 to rotate faster than the take-up loading gear 50 do.

Operation of a VCR tape loading mechanism according to the present invention will be described, referring to FIGS. 4 to 6, as follows.

Upon the clockwise rotation of the loading motor 14, the cam gear 9 rotates counter clockwise through power transmission of a motor pulley 13, a belt 12, an worm pulley 11 and a worm 10, and the sector gear 8 rotates in the clockwise direction in response to the movement mentioned above and rotates the take-up loading gear 50 counter clockwise by the rotation of the first gear part 51 of the take-up loading gear 50 meshing with the gear teeth 8a of the sector gear 8, and the supply loading gear 40 rotates clockwise by the rotation of the geared section 41 of the supply loading gear 40 meshing with above mentioned second gear part 53 of the take-up loading gear 50.

Accordingly, slant bases 4 and 4 are moved to loading direction along the guide grooves 3 and 3' respectively by the movement of first loading levers 6 and 6' respectively connected to loading gears 40 and 50 respectively, and second loading levers 7 and 7' connected to above loading levers 6 and 6' respectively.

Meanwhile, because the P.C.D. of the supply loading gear 40 is smaller than that of the second gear part 53 of the take-up loading gear 50, the supply loading gear 40 rotates faster than the take-up loading gear does thereby the supply slant base 4 reaches to the supply side stopper 2 and pushes against the stopper 2 before the take-up slant base 4' does. (Refer to FIG. 5). On the other hand, at this time the non geared section 53b of the second gear part 53 of the take-up loading gear 50 come to engage with the end tooth 41a of the geared section 41 of the supply loading gear 40 and pushes stopper 2.

When the take-up loading gear 50 rotates further, the take-up slant base 4' reaches to and starts to push against take-up side stopper 2' while the supply loading gear 40 does not rotate any further but continues to push stopper 2, whereby the loading operations of the supply/take-up slant bases 4 and 4' have been completed.

Figure 9A:
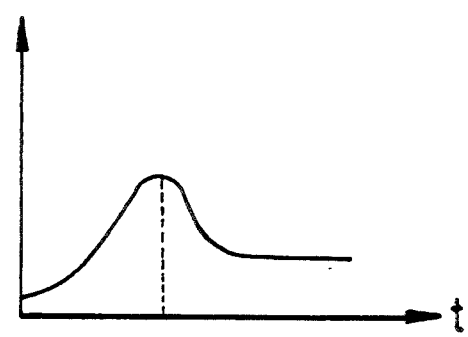
FIGS. 9 (a), (b) and (c) show load-time curves of loading gears and an electric current-time curve of a loading motor of the present invention of a VCR tape loading mechanism as follows;
(a) A load-time curve of a supply loading gear.
(b) A load-time curve of a take-up loading gear.
(c) An electric current-time curve of a loading motor.
Figure 8B:
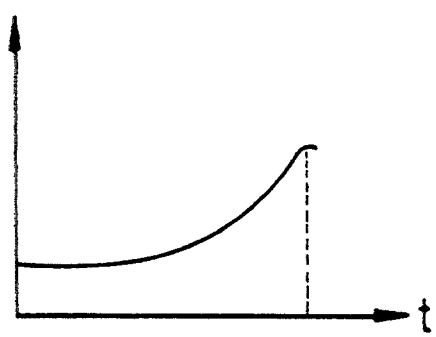
Figure 9B:
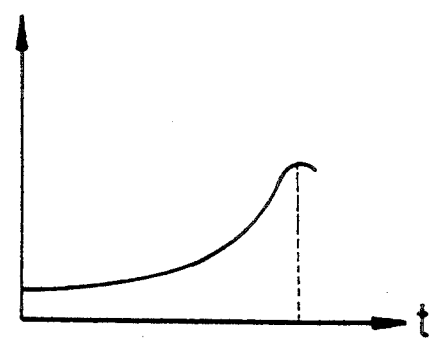
Figure 8C:
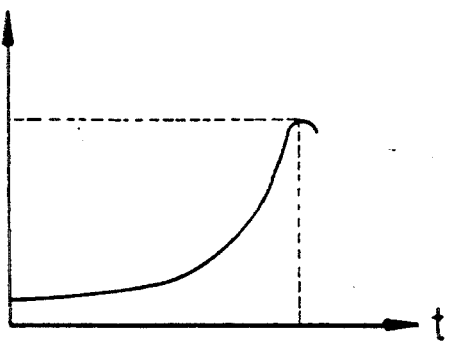
Figure 9C:
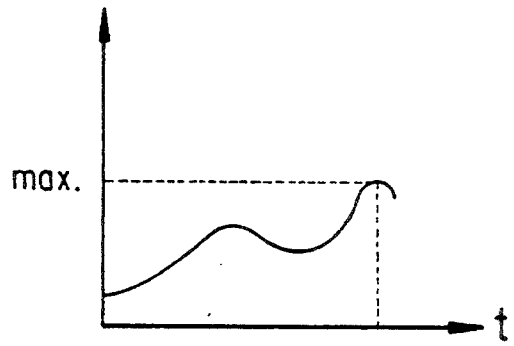

In this way, as shown in FIGS. 9(a) and (b) the time lag between supply slant base 4 and take-up slant base 4' in the starting of pushing against stoppers 2 and 2' results in the same time lag between supply/take-up loading gears 40 and 50 in the timing of maximum load, thereby the maximum load electric current to the loading motor 14 is lowered as shown in FIG. 9(c).

On the other hand, on starting of unloading, though the take-up loading gear 50 rotates clockwise upon the reversal of loading motor 14, the supply loading gear does not rotate because the end tooth 41a of the geared section 41 of the supply loading gear 40 is in contact with the non geared section 53b of the second gear part 53 of the take-up loading gear 50, accordingly the supply slant base 4 does not move, too. Eventually only the take-up slant base 4' moves to an unloading direction along the guide groove 3 at the starting of the unloading.

When the non geared section 53b of the second gear part 53 stops moving upon further rotation of the take-up loading gear 50, the geared section 41 of the supply loading gear 40 meshes with the second gear part 53 of the take-up loading gear 50 smoothly again and starts to rotate, because the supply loading gear 40 tends to rotate in counter clockwise direction due to the pushing force from the take-up loading gear 50.

Accordingly the supply slant base 4 starts to unload, too.

Meanwhile, though only the case that the first completion of loading by the supply slant base has been described for convenience's sake, it is easily understood that the adaptation of the first completion of loading by the take up slant base is of course possible instead.

As described above, according to the present invention, both because of the time lag between the two slant bases 4 and 4' to reach and push respective stoppers 2 and 2', and because of the much smaller load transmitted to the loading motor due to the supporting of the pushing force on the supply loading gear by the non geared section of the two loading gears after the supply slant base is pushed, overall, the maximum load exerted on the loading motor is lowered thereby, as shown in FIG. 9, and the maximum electric current of the loading motor becomes smaller Therefore, there can be increased motor capacity, reduction in the consumption of electricity, and especially in camcorders the extension of battery life, and products can be made more reliable due to the extended life of the motor resulted from the motor not being overloaded.

Although the preferred embodiments of the invention have been disclosed for illustrative purposes, those skilled in the art will appreciate that various modifications, additions and substitutions are possible without departing from the scope and spirt of the invention as described in accompanying claims.

What is claimed is:

1. A tape loading apparatus of a video cassette recorder, comprising:
   members for drawing out tape from a video cassette;
   first and second bases for mounting said members, said first base being independently and operatively connected with a first power transmitting gear means and said second base being independently and operatively connected with a second power transmitting gear means;
   means for moving said first and second bases to a loading position where said first base engages a first stopper and said second base engages a second stopper, and wherein said first base engages the first stopper before said second base engages the second stopper resulting in a difference in time between when said first and second bases engage the first and second stoppers; and
   a power source for driving said moving means, said first and second power transmitting gear means receiving power generated by said power source;
   wherein a load electric current of said power source for loading said means is reduced because a load exerted on said means for moving said first and second bases occurs within said difference in time.

2. The tape loading apparatus of a video cassette recorder as claimed in claim 1, wherein said first power transmitting gear means includes a first loading gear having a first gear part for receiving power generated from said power source and a second gear part having a diameter coaxially provided adjacent to said first gear part; and
   a second loading gear having a pitch circle diameter smaller than the diameter of said second gear part and meshing with said second gear part.

3. The tape loading apparatus of a video cassette recorder as claimed in claim 2, wherein said second gear part of said first loading gear has first geared and non-geared sections, and said second loading gear has second geared and non-geared sections, wherein said first geared section of said first loading gear is meshed with said second geared section of said second loading gear selectively.

4. The tape loading apparatus of a video cassette recorder as claimed in claim 2, which further comprises first and second loading levers, connected to said first and second bases respectively and to said first and second loading gears respectively, for moving said first and second bases in accordance with a rotation of said first and second loading gears respectively.

5. The tape loading apparatus of a video cassette recorder as claimed in claim 4, wherein said first and second loading levers include first sub-loading levers connected to said first and second loading gears respectively, and second sub-loading levers connected to said first and second bases respectively, wherein said first sub-loading levers and said second sub-loading levers are rotatably connected together respectively.

6. The tape loading apparatus of a video cassette recorder as claimed in claim 2, wherein said first loading gear comprises a take-up loading gear and said second loading gear comprises a supply loading gear.

7. The tape loading apparatus of a video cassette recorder as claimed in claim 2, wherein said first loading gear comprises a supply loading gear and said second loading gear comprises a take-up loading gear.

8. The tape loading apparatus of a video cassette recorder as claimed in claim 2, further comprising a sector gear having gear teeth meshing with said first gear part and a pin,
   a cam gear having a cam groove accepting said pin of the section gear, and
   power transmission means for transmitting the power generated by power source to said cam gear.

9. The tape loading apparatus of a video cassette recorder as claimed in claim 8, wherein said power transmission means includes a loading motor pulley connected to said power source, a worm pulley, a belt coupling said loading motor pulley and said worm pulley, and a worm connected to said worm pulley and meshing with said cam gear.

10. The tape loading apparatus of a video cassette recorder as claimed in claim 9, wherein said power source comprises a loading motor.

11. The tape loading apparatus of a video cassette recorder as claimed in claim 1, wherein said moving means moves said first and second bases to an unloading position where said first base disengages the first stopper before said second base disengages the second stopper resulting in a second difference in time between when said first and second bases disengages the first and second stoppers.

12. A tape loading apparatus of a video cassette recorder, comprising:
   members for drawing out tape from a video cassette;
   first and second bases for mounting said members, said first base being independently connected with a first power transmitting gear means and said second base being independently connected with a second power transmitting gear means;
   means for moving said first and second bases to a loading position where said first base engages a first stopper and said second base engages a second stopper, wherein said moving means includes:
   a power source for driving said moving means, said first and second power transmitting gear means receiving power generated by said power source;
   a first loading gear having a first gear part for receiving power generated from said power source and a second gear part having a diameter, said second gear part coaxially provided adjacent to said first gear part; and a second loading gear having a pitch circle diameter smaller than the diameter of said second gear part and meshing with said second gear part;

and wherein said first base engages the first stopper before said second base engages the second stopper resulting in a difference in time between when said first and second bases engage the first and second stoppers; and wherein a load electric current of said power source for loading said means is reduced because a load exerted on said means for moving said first and second bases occurs within said difference in time.

* * * * *